(No Model.)

P. GREGORY.
MOLD BOARD FOR SIDE HILL PLOWS.

No. 285,481. Patented Sept. 25, 1883.

Witnesses,
Geo. H. Strong.
J. H. Krouse

Inventor,
Paul Gregory
By Dewey & Co.
Attorneys

UNITED STATES PATENT OFFICE.

PAUL GREGORY, OF DAVENPORT'S LANDING, CALIFORNIA.

MOLD-BOARD FOR SIDE-HILL PLOWS.

SPECIFICATION forming part of Letters Patent No. 285,481, dated September 25, 1883.

Application filed December 18, 1882. (No model.)

*To all whom it may concern:*

Be it known that I, PAUL GREGORY, of Davenport's Landing, county of Santa Cruz, State of California, have invented an Improved Mold-Board for Side-Hill Plows; and I hereby declare the following to be a full, clear, and exact description thereof.

My invention relates to an improved mold-board for that class of plows adapted for work upon a hillside, and commonly known as "side-hill plows."

The mold-boards of plows designed for level land have long since been found unsuitable for side-hill work, and a straight mold-board, which was tried, was found undesirable, because of its rear end, which was left straight, cutting the sod already thrown out. To remedy this a convex mold-board was adopted with a slightly curved or rounded rear edge, under the impression, which still prevails, that it would not only pass over the thrown-out sod without cutting it, but would throw the sod out of the furrow to the best advantage. Side-hill plows now used, as far as I am aware, all have this convex mold-board, though lately there appears to be a tendency to return to the straight mold-board with a rounded rear end, as being better in all respects; but I have found objections to both forms in the manner in which they throw the sod to one side and impede the progress of the plow.

It is the object of my invention to provide a mold-board for this class of plows which shall turn the earth out of the furrow to one side to the best advantage, both as regards the completeness of the throw and the progress of the plow with the least hinderance.

To this end my invention consists in a mold-board having a laterally-concaved face, its rear edges being rounded or curved to a point to avoid cutting the sod.

Figure 1:
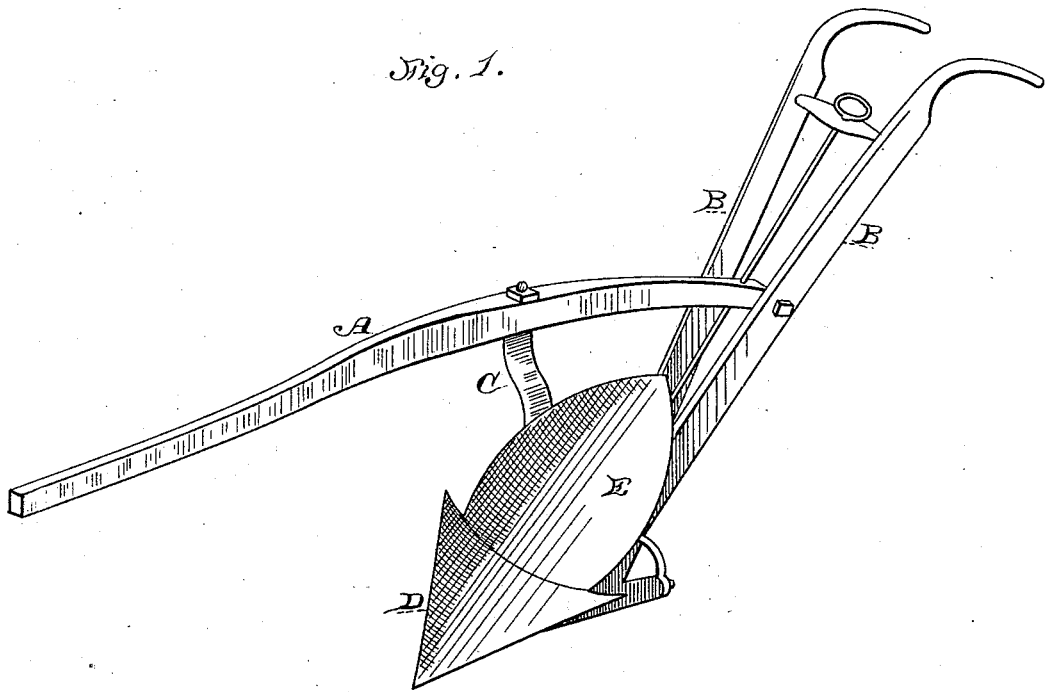
Figure 2:
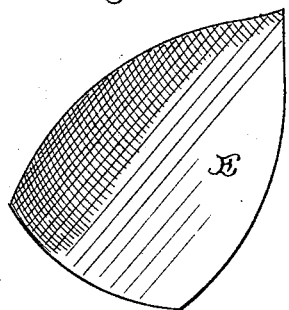

Referring to the accompanying drawings, Figure 1 shows a view of my mold-board when applied to a plow. Fig. 2 is a view of the mold-board alone.

Let A represent the beam, and B B the handles, of a plow.

The distinctive feature of a side-hill plow is that its mold-board and share are so secured or pivoted to the landside or standard as will adapt them to be reversed in order to make the return-furrow, instead of having to make a circuit. This is done in several ways; but a well-known form is by means of a pivot at each end of the landside, upon which a projection upon the inner side of the point and a brace from the rear end of the mold-board are fitted, so that said landside, when the plow is raised, will act as a horizontal axis, around which the mold-board and point may move to the opposite side. Suitable devices are employed to fix the parts in position when adjusted. I have not herein deemed it necessary to illustrate this reversible feature of the plow further than by description, as for my purpose the particular mechanism by which it is carried into effect is unimportant. My invention is applicable to any such plow.

C is the standard from the beam to the landside.

D represents the plow-point, and E is my mold-board. The particular shape of this mold-board is shown in Fig. 2. It is concaved laterally—that is, in the direction of its width. At its rear end its edges are curved to a point. and it is secured suitably by a brace pivoted to the rear end of a landside. At its forward end it is secured by means of a connecting-plate to the point D, which is itself pivoted on its inner side, in a manner not here shown, to the forward end of the landside.

I may use any means for connecting this mold-board to the other parts and to the point; or, if I should find it preferable, I could make both mold-board and point of a single piece.

As I have heretofore stated, mold-boards for side-hill plows are generally made convex; but in this form, when the sod is heavy, it either gets in under the mold-board or rises over it and drops back into the furrow or forward crosswise, which makes very poor plowing. It also impedes the progress of the plow, because of the inefficient manner in which it turns the sod. The straight mold-board is better; but it does not throw the sod with sufficient exactness, and unless its rear end is curved, it is liable to cut the sod already thrown out; but by the concaved mold-board, as here shown, the earth is confined and directed to one side with precision. It can neither get under nor pass over, but must fall to one side, clear of the furrow, in the same manner as on level ground. By having its rear end curved to a point, there is no danger of its cutting the thrown-out sod. The plow is not in the least impeded, but progresses as easily as an ordinary plow in level ground.

This mold-board may be used on level ground as well as on a hillside—a use to which an ordinary side-hill plow cannot be put.

Having thus described my invention, what I claim as new, and desire to secure by Letters Patent, is—

The combination, with the beam and standard of a plow, of the mold-board E, formed with a concavity extending laterally of its area, and having its rear edges curved to a central point, the mold-board thus formed being equally concave throughout its length, and slanting at an angle of about forty-five degrees, substantially as and for the purposes specified.

In witness whereof I hereunto set my hand.

PAUL GREGORY.

Witnesses:
JNO. THORNE,
J. H. BLOOD.